(12) United States Patent
Ogawa et al.

(10) Patent No.: US 10,376,096 B2
(45) Date of Patent: Aug. 13, 2019

(54) METHOD OF BAKING BOTH SIDES OF INGREDIENTS AND AN ELECTRIC COOKER USED THEREFOR

(71) Applicant: Suntec Co., Ltd., Sumida-ku, Tokyo (JP)

(72) Inventors: Tomoyuki Ogawa, Matsudo (JP); Yasuo Wada, Ichikawa (JP)

(73) Assignee: Suntec Co., Ltd., Tokyo (JP)

( * ) Notice: Subject to any disclaimer, the term of this patent is extended or adjusted under 35 U.S.C. 154(b) by 388 days.

(21) Appl. No.: 15/112,942

(22) PCT Filed: Jun. 2, 2016

(86) PCT No.: PCT/JP2016/066505
§ 371 (c)(1),
(2) Date: Jul. 20, 2016

(87) PCT Pub. No.: WO2017/138159
PCT Pub. Date: Aug. 17, 2017

(65) Prior Publication Data
US 2018/0064285 A1    Mar. 8, 2018

(30) Foreign Application Priority Data

Feb. 8, 2016  (JP) .................................. 2016-022016

(51) Int. Cl.
| | |
|---|---|
| *A47J 37/01* | (2006.01) |
| *A21B 3/13* | (2006.01) |
| *A21B 5/00* | (2006.01) |
| *A47J 37/06* | (2006.01) |

(52) U.S. Cl.
CPC ............. *A47J 37/015* (2013.01); *A21B 3/132* (2013.01); *A21B 5/00* (2013.01); *A47J 37/0611* (2013.01)

(58) Field of Classification Search
CPC ..... A47J 37/015; A47J 37/0611; A21B 3/132; A21B 5/00
See application file for complete search history.

(56) References Cited

U.S. PATENT DOCUMENTS

| | | | | |
|---|---|---|---|---|
| 1,759,832 A | * | 5/1930 | Banff | .................... A47J 37/0611 219/478 |
| 3,584,208 A | * | 6/1971 | Slawson | ................ G05B 11/00 235/200 PF |
| 4,362,924 A | * | 12/1982 | Story | ..................... G05D 23/22 219/492 |
| 4,629,852 A | * | 12/1986 | Andre | .................... G05D 23/20 219/492 |
| 5,396,047 A | * | 3/1995 | Schilling | ............... F24C 15/106 219/448.11 |

(Continued)

FOREIGN PATENT DOCUMENTS

JP                5453476 B2     3/2014

*Primary Examiner* — Steven N Leff
(74) *Attorney, Agent, or Firm* — Klarquist Sparkman, LLP (57) ABSTRACT

In a method of baking both sides of ingredients between upper and lower dies with the upper and lower electric heaters respectively, a temperature of one of the lower and upper dies is detected. Based on temperature information detected thereby, consumed power of the other of the lower and upper dies is controlled, thereby making a temperature of the lower die closer to that of the upper die, thereby baking both sides of the ingredients.

10 Claims, 11 Drawing Sheets

(56) References Cited

U.S. PATENT DOCUMENTS

| | | | | |
|---|---|---|---|---|
| 5,397,406 | A * | 3/1995 | Vaders | B27M 3/0093 156/219 |
| 5,636,564 | A * | 6/1997 | Weiss | A47J 37/0611 219/441 |
| 6,427,581 | B1 * | 8/2002 | Wu | A47J 37/0611 99/331 |
| 7,159,437 | B2 * | 1/2007 | Schroth | B21D 37/16 72/342.8 |
| 7,285,751 | B2 * | 10/2007 | Li | A47J 37/0623 219/386 |
| 7,342,202 | B2 * | 3/2008 | Bachinski | A47J 37/0709 219/386 |
| 8,530,795 | B2 * | 9/2013 | Shingler | H05B 6/68 219/254 |
| 8,671,830 | B2 * | 3/2014 | Lamont | A47J 37/06 99/349 |
| 9,265,380 | B2 * | 2/2016 | Krishnan | A47J 37/0611 |
| 2005/0000957 | A1 * | 1/2005 | Jones | A47J 27/62 219/450.1 |
| 2008/0236405 | A1 * | 10/2008 | Lee | F24C 15/105 99/331 |
| 2012/0148713 | A1 * | 6/2012 | Owensby | A23L 5/10 426/233 |
| 2015/0245420 | A1 * | 8/2015 | Peterson | A47J 37/0658 99/358 |
| 2016/0037968 | A1 * | 2/2016 | Meraz | A47J 37/0611 99/372 |

* cited by examiner

METHOD OF BAKING BOTH SIDES OF INGREDIENTS AND AN ELECTRIC COOKER USED THEREFOR

CROSS REFERENCE TO RELATED APPLICATIONS

This is the U.S. National Stage of International Application No. PCT/JP2016/066505, filed Jun. 2, 2016, which in turn claims the benefit of and priority to Japanese Patent Application No. JP2016-022016, filed Feb. 8, 2016, which is incorporated herein by reference.

BACKGROUND OF THE INVENTION

The present invention relates to a method of baking both sides of ingredients and an electric cooker used therefor, the method comprising disposing the ingredients between a lower die and an upper die, and baking upper and lower sides of the ingredients by heating the upper and lower dies with electric heaters with the same rated powers.

Such an electric cooker is disclosed in JP5453476B2 issued to the same applicant as one of this invention.

The electric cooker comprises a lower housing in which a lower die is mounted on the upper surface and an upper housing in which an upper die is mounted on the lower surface, rear ends of the upper and lower housings being pivotally mounted, the upper housing being rotated downward with respect to the lower housing, the upper surface of the lower housing coming in contact with the lower surface of the upper housing, the upper and lower dies being heated by heaters with the same rated power at the same time during a certain time so that the ingredients such as snack cakes are baked in recesses between the upper and lower surfaces.

In the electric cooker, the upper and lower dies are detachably disposed in the upper and lower housings and are replaced with differently shaped dies so that different snack cakes can be baked by the same electric cooker.

The electric cooker in JP5453476B2 involves the following problems.

The upper and lower dies are heated by the heaters with the same rated power during a certain time, the upper surface of the dough in contact with the upper die is burnt and is not uniformly baked as a whole. This is because the upper die is fanned by the lower die with heat, so that the temperature of the upper die is higher than that of the lower die by 10-15° C.

When different snack cakes are baked by replacing the upper and lower dies with differently-shaped dies, the surface of the dough is likely burnt. In order to bake different snack cakes, recesses in the upper die is shallower than those in the lower die and accordingly, the upper die is thinner than the lower die. The surface of the dough is likely burnt.

Figure 13:
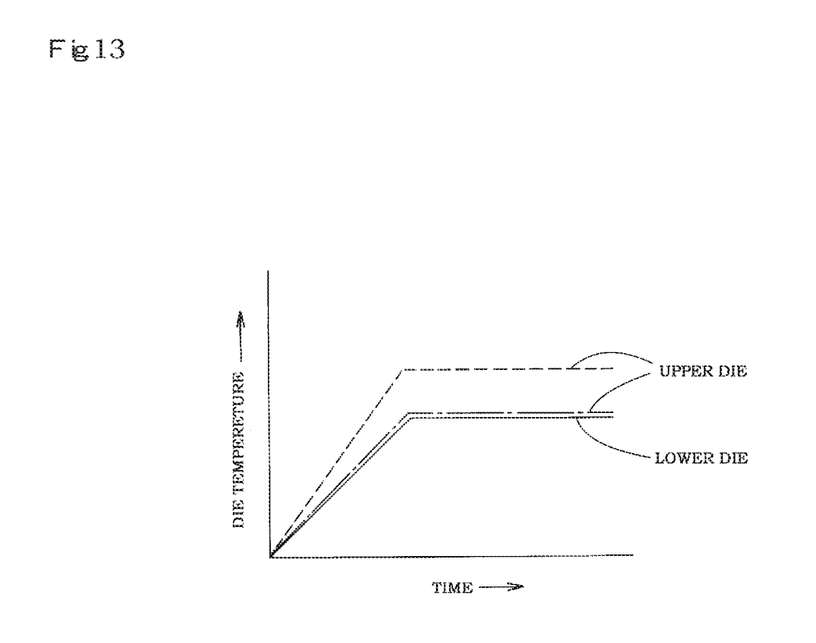
FIG. 13 is a graph showing temperature difference between a lower die and an upper die having different mass.

The reasons are reviewed. The upper die is shallower than the lower die, and the mass of the upper die is smaller than that of the lower die. The upper die with smaller mass is heated by the same heater for the lower die thereby causing the problem. The mass is proportional to heat capacity. Heat capacity reduces with smaller mass. Thus, in FIG. 13, the upper die is higher in temperature than the lower die. The surface of the dough in contact with upper die is excessively heated and is likely to be burnt.

In order to solve the problem and to get closer in temperature of the upper and lower dies, the mass of the upper die is set to be equal to that of the lower die. The temperatures of the upper and lower dies are detected by temperature sensors respectively. Based on detected temperature, consumed powers for the upper and lower heaters are controlled by temperature sensors respectively, or heaters with different rated power are manufactured to comply with the masses of the upper and lower dies.

However, the following disadvantages are involved in any of the methods.

Specifically, if the upper die is set to be equal to the lower die in mass, the upper die with the shallower recesses can be reduced in thickness, but has to be increased in mass by increasing its thickness. The cost for manufacturing the upper die comes to nothing, thereby increasing the cost for the upper die.

By detecting the temperatures of the upper and lower dies with the temperature sensors, consumed powers of the upper and lower heaters are controlled by the temperature control device respectively. So the control system and device become complicated.

Furthermore, in order to comply with the masses of the upper and lower dies, a plurality of different rated-power heaters has to be manufactured thereby increasing the cost if there are a lot of heaters, In view of the disadvantages, it is an object of the invention to provide a method of baking both sides of ingredients and an electric cooker used therefor wherein ingredients are uniformly baked by making a lower die closer to an upper die in temperature, and the method and the cooker is inexpensive.

DETAILED DESCRIPTION

An embodiment of the present invention will be described with respect to the drawings.

In FIGS. 1-4, an electric cooker in the embodiment aims to bake rodlike snack cakes and comprises a rectangular box-like lower housing 1; a U-shaped support 2 fixed to the rear end on the upper surface of the lower housing 1; a U-shaped handle 4 pivotally mounted at the rear end to a pair of upright portions 2a, 2a of the support 2; a substantially square upper housing 5 fixed over a surface between a side 4a and a side 4a of the handle 4; a lower die 6 mounted over the upper surface of the lower housing 1; and an upper die 7 mounted on the lower surface of the upper housing 5. In the following description, front and rear, right and left and upper and lower directions for the upper die 5 and members mounted thereto relate to use in FIG. 3 in which the upper housing 5 pivoted downward is on the lower housing 1.

Figure 3:
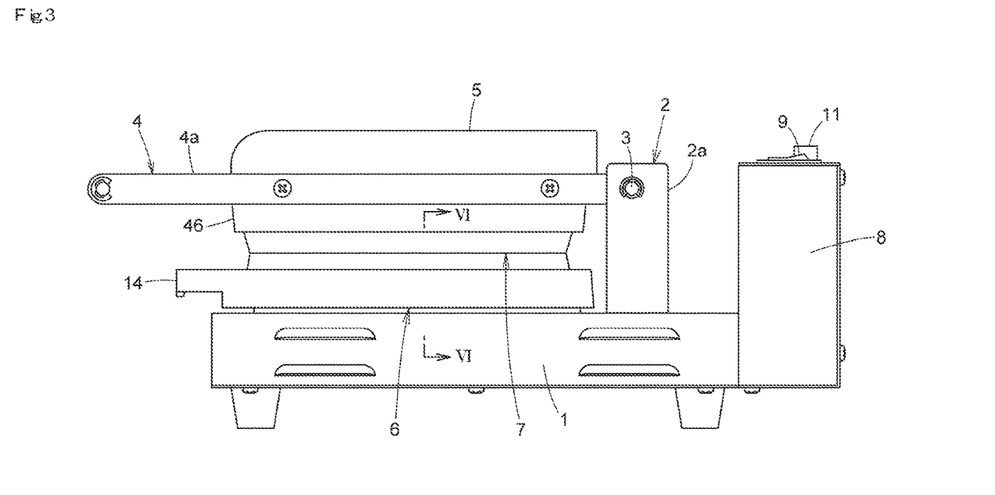
FIG. 3 is a right side elevational view of the cooker in which an upper housing is pivoted downward in use.

The upper housing 5 is fixed to the handle 4 and rotates from a substantially horizontal position to a standby position slightly over 90 degrees, such as approximately 100 degrees around a pivot shaft 3 upward.

Figure 6:
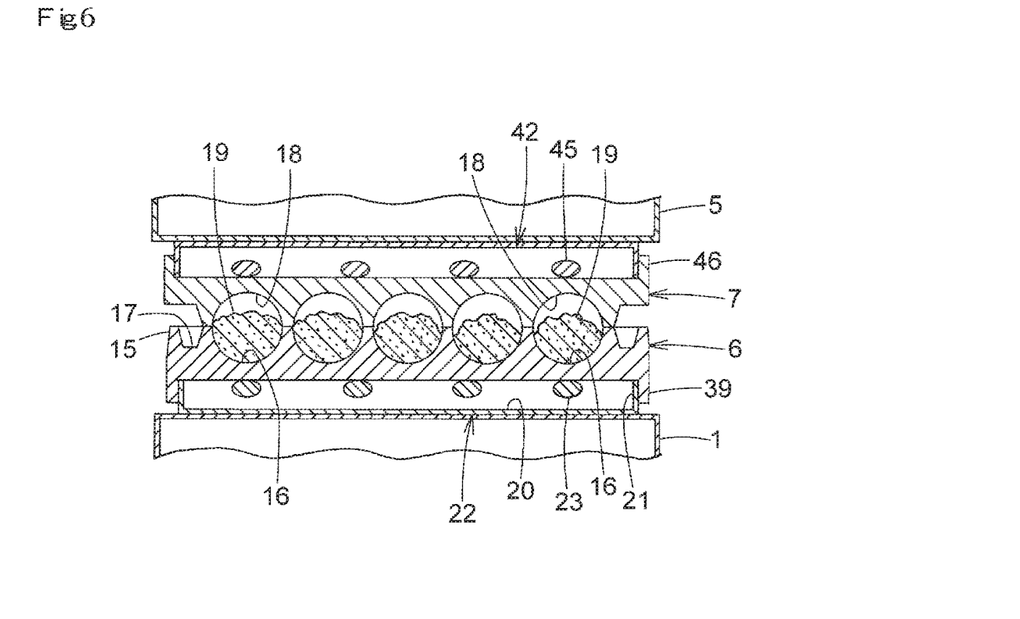
FIG. 6 is a vertical front view taken along the line VI-VI in FIG. 3.

A control box 8 mounted to the rear surface of the lower housing 1 comprises on its upper surface a main power switch 9; four preset buttons 10 that enables adjust temperature of the upper die 7 by actuating a preset switch 51 of a feed circuit later described and varying power transmission rate or consumed power of an upper electric heater 45 later described; a timer knob 11 for setting baking time of dough 19 in FIG. 6; a display 12 digitally displaying setting temperature of the upper die 7 with the preset button 10; power transmission rate and heating time with the timer knob 11; and a time-setting button 13. Numbers 1 to 4 are inscribed in the four preset buttons 10 corresponding to power transmission rate to the upper electric heater 45.

The lower die 6 is made of highly heat conductive Al alloy like a substantially square and an oil-collecting portion 14 projects from the middle of the front end. The lower die 6 is surrounded by an upward portion 15 except a front edge of the oil-collecting portion 14. A plurality of recesses 16 each of which has a semicircular section is formed in an upper surface of the lower die 6 except the outer periphery.

An oil-discharging groove 17 is formed to be continuous with the upper surface of the oil-collecting portion 14 between the upward portion 15 and a part in which the recesses 16 are formed. The bottom surface of the oil-discharging groove 17 and upper surface of the oil-collecting portion 14 are tilted forward and downward. Oil that is oozing from the baked dough 19 flows toward the oil-collecting portion 14 via the oil-discharging groove 17. Oil dropped down from the front edge of the oil-collecting portion 14 can be collected in an oil container (not shown). Snack cakes which contain a little oil and good texture can be cooked.

The upper die 7 is made of Al alloy like a substantial square and has a plurality of recesses 18 each of which has an arcuate section and faces the recess 16 of the lower die 6, in the lower surface facing the lower die 6. In FIG. 6, the recess 18 of the upper die 7 is shallower than the recess 16 of the lower die 6. This is because a certain amount of the dough 19, heated ingredients, is inserted in the recess 16 of the lower die 6.

When the recess 18 of the upper die 7 is shallower than the recess 16 of the lower die 6, the upper die 7 is generally thinner than the lower die 6, thereby making mass of the upper die 7 smaller than the lower die 6. In this embodiment, when mass of the lower die 6 is 1 kg, mass of the upper die 6 is about 900 g by 10% reduction in mass of the lower die 6 to the upper die 7.

Figure 2:
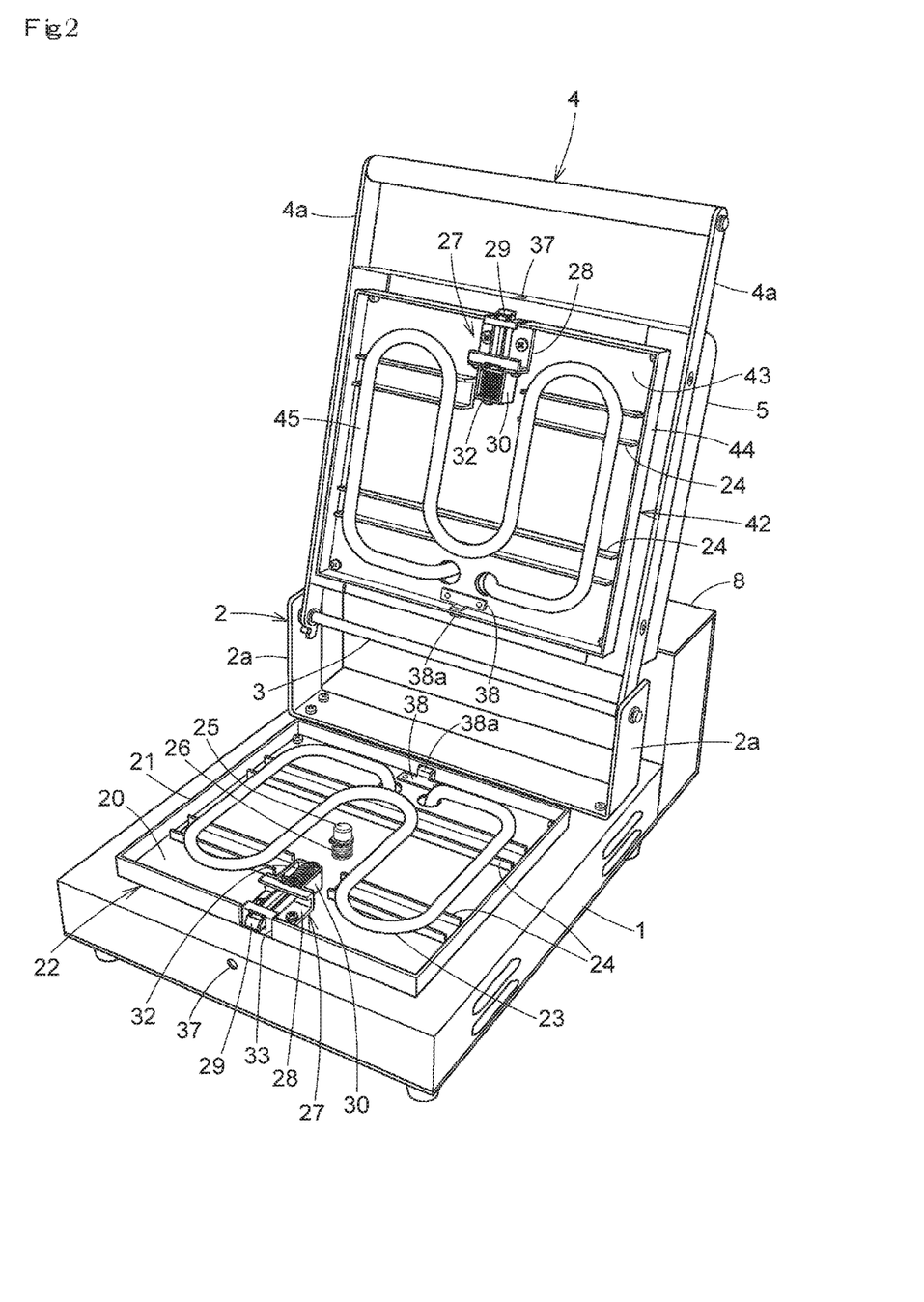
FIG. 2 is a front perspective view of the electric cooker from which upper and lower dies are removed.

In FIG. 2 in which the upper and lower dies are removed, a lower-die holding member 22 that comprises a rectangular bottom plate 20 and a rectangular upper frame 21 is screwed in the upper surface of the lower housing 1.

Within the upward frame 21, a lower electric heater 23 that meanders like U is spaced from the upper surface of the bottom plate 20 of the lower-die holding member 22. The end of the lower electric heater 23 is supported by a supporting member (not shown) within the lower housing 1.

A lower electric heater 23 and an upper electric heater 45 later described both comprise a sheath heater with rated power or the maximum consumed power for 375 W. Their terminals are connected to a feed circuit later described in the control box 8. When the lower die 6 is heated by the lower electric heater 23 at the maximum consumed power, heating temperature of the lower die 6 is set to about 180° C. The upper surface of the lower electric heater 23 slightly projects from the upper end of the upward frame 21, and is pressed downward when the lower die 6 is attached to elastically press on the lower surface of the lower die 6.

Under the lower electric heater 23, two heater supports 24, 24 each of which has a U-shaped cross-section are fixed by spot welding on the upper surface of the bottom plate 20 of the lower holding member 22. When the lower die 6 is equipped, the lower surface of the lower electric heater 23 comes in contact with the upper edge of each of the heater support 24 so that the lower electric heater 23 is kept approximately horizontal.

On the center of the bottom plate 20 of the lower-die holding member 22, a temperature sensor 25 that detects temperature of the lower die 6 is mounted and biased upward usually by a spring 26. The upper end of the temperature sensor 25 is elastically pressed by the lower surface of the lower die 6 at the center in FIG. 7 when the lower die 6 is mounted.

A latch device 27 is provided in the middle of the front of the bottom plate 20 of the lower-die holding member 22. The latch device 27 has the same structure as the latch device filed by the applicant and granted as JP5453476B2 so that the lower die 6 is detachably mounted to the lower housing 1 for replacement with another die.

Figure 7:
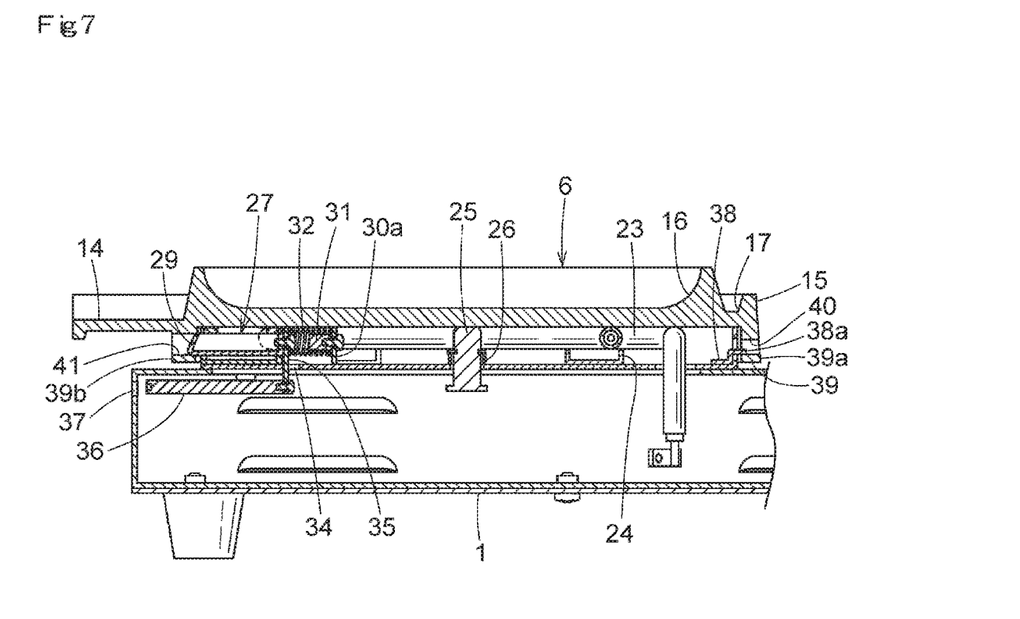
FIG. 7 is an enlarged vertical sectional side view taken along the line VII-VII in FIG. 5.

In FIG. 7, a latch device 27 comprises a latch holder 28 fixed on the upper surface of the bottom plate 20; a latch 29 mounted on the latch holder 28 to move longitudinally; a U-shaped spring holder 30 fixed on the rear surface of the latch holder 28; a rod-like spring guide 31 mounted with a screw in the front surface of a rear portion 30a of the spring holder 30; and a compression spring 32 in which a rear part engages with the spring guide 31, the spring 32 being disposed between the rear surface of the latch 29 and the spring holder 30. The front end of the latch 29 is telescopic forward and backward from a notch 33 of the upward frame 21 and is slightly projected forward by force of the compression spring 32.

In FIG. 7, the rear end of an operating rod 36 is fixed to a front surface of a suspending portion 35 fixed at the rear end of the latch 29 and suspending through an opening 34 of the bottom plate 20. The operating rod 36 pushes the latch 29 backward against the compression spring 32. In FIG. 2, a circular through hole 37 is formed through a front face of the lower housing 1 facing the front end of the operating rod 36. A screw driver or a rod-like tool is put through the through hole 37, and the operating rod 36 is pushed backward, so that the latch 29 can be moved back with the suspending portion 35. The operation is carried out as described later when the lower die 6 is taken out of the lower-die holding member 22.

An engagement metal fitting 38 is fixed on the upper surface of the bottom plate 20 in the middle of the rear end across from the latch device 27. At the rear edge of the engagement metal fitting 38, an inverted L-shaped projection 38a projects through the upward frame 21 backward.

Figure 1:
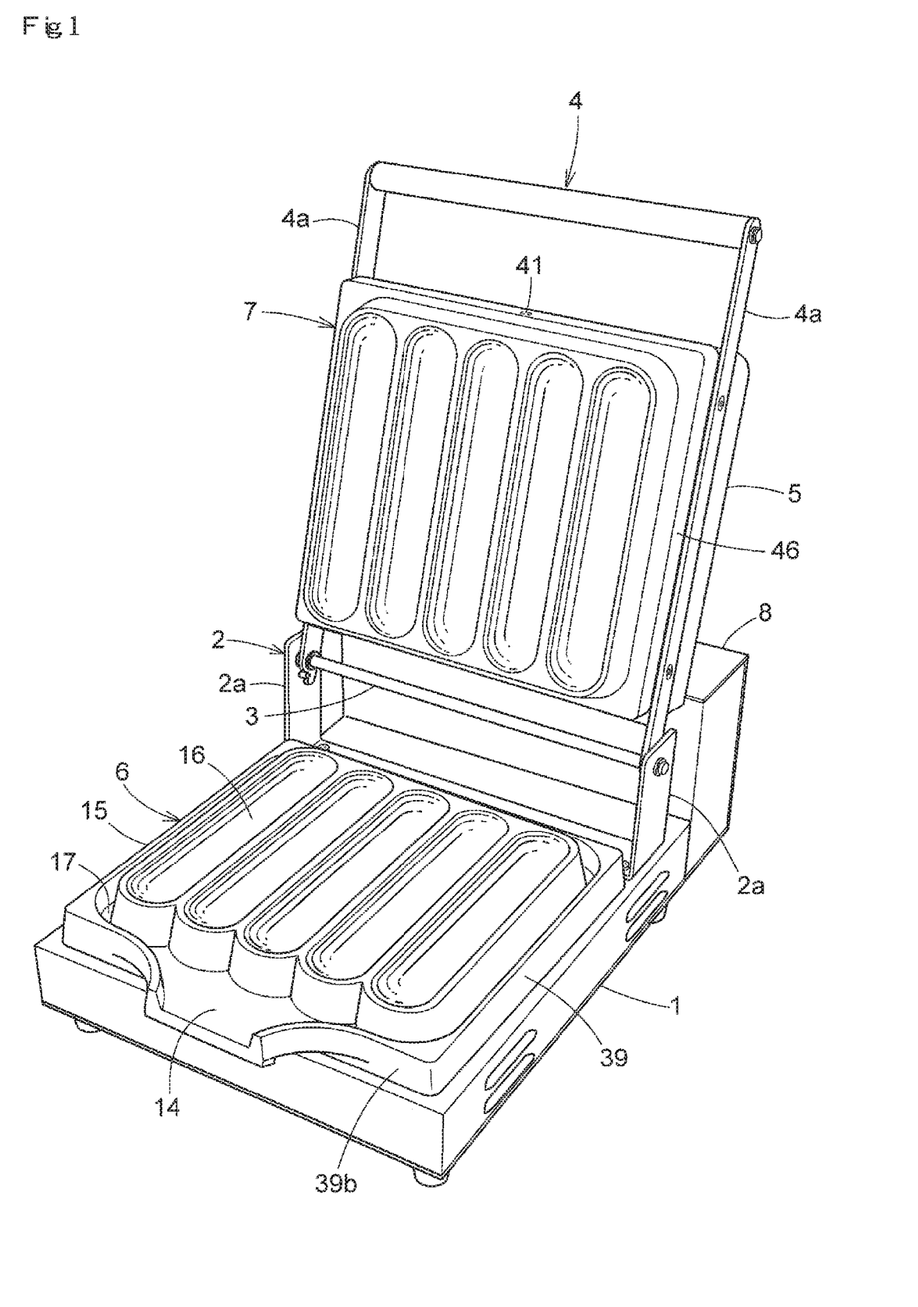
FIG. 1 is a front perspective view of one embodiment of an electric cooker according to the present invention, an upper housing being pivoted upward.

In FIGS. 1, 3 and 7, a suspending portion 39 projects from the outer circumference of the back surface of the lower die 6 and detachably fits on the upward frame 21 of the lower-die holding member 22 from above. In the middle of a rear portion 39*a* and a front portion 39*b* facing each other, a first engagement hole 40 and a second engagement hole 41 are formed. The rear projection 38*a* of the upward frame 21 fits in the first engagement hole 40, and the front end of the latch 29 fits in the second engagement hole 41.

After the projection 38*a* fits in the first engagement hole 40, the suspending portion 39 of the lower die 6 fits over the upward frame 21, and the lower edge of the front portion 39*b* of the suspending portion 39 comes in contact with a tilted surface of the front end of the latch 29, so that the latch 29 is moves back slightly. When the front end faces the second engagement hole 41, the latch 29 is moved forward again by a force of the compression spring 32, and the front end automatically moves into the second engagement hole 41. Thus, the lower die 6 can easily be attached over the lower housing 1. As mentioned above, a screwdriver is put into the through hole 37 in the front face of the lower housing 1, and the latch 29 is moved back via the operating rod 36, so that the lower die 6 can easily be removed alone.

On the lower surface of the upper housing 5, an upper-die holding member 42 that has the same shape as the lower-die holding member 22 and is symmetrical vertically is fastened with screws. The upper-die holding member 42 comprises an upper plate 43 and a rectangular downward frame 44 that suspends from the outer periphery and is open downward.

Within the downward frame 44, there is disposed an upper electric heater 45 with the same shape and the same rated power for 375 W as the lower electric heater 23 symmetrically with the lower electric heater 23 vertically.

Heater supports 24, 24, a latch device 27 and an engagement metal fitting 38 are mounted on the upper plate 43 as well as those in the lower-die holding member 22 symmetrically with those of the lower-die holding member 22 vertically. The latch device 27 etc. have the same structure as those in the lower housing 1, and are not described in detail.

On the outer periphery of the upper surface of the upper die 7, an upright portion 46 is formed to fit on the downward frame 44, and a first engagement hole 40 and a second engagement hole 41 are formed in the upright portion 46 as well as the lower die 6. The first engagement hole 41 is not shown.

The upper die 7 is attached to the upper housing 5 by the same way as the lower die 6.

Then, the feed circuit in the control box 8 will be described.

The lower electric heater 23 for heating the lower die 6 is connected to a circuit of a commercial 100V AC power source 47. The main power switch 9 is turned on, and OFF time is set with the timer knob 11. Power is fed into the lower electric heater 23 at 375 W for the maximum rated consumed power (power transmission rate 100%). Thus, as mentioned above, when the lower die 6 is 1 kg mass, the lower die 6 is heated at about 180° C.

The upper electric heater 45 for heating the upper die 7 is connected to the AC power source 47 via an AC ON/OFF type semiconductor switch 49 in parallel with the lower electric heater 23. To a circuit of the AC power source 47 is connected an upper-heater power control device 50 into which a voltage signal is supplied from the circuit. In the upper-heater power control device 50 in this embodiment, a known ON/OFF time division control system with semiconductors are used. The ON/OFF time division control system controls effective power by changing ratio of time of ON/OFF in one cycle and noise is hardly generated. Temperature information about the lower die 6 detected by the temperature sensor 25 is supplied into the upper-heater power control device 50.

An ON/OFF control signal for turning AC voltage ON and OFF is supplied from the upper-heater power control device 50 into the semiconductor switch 49. The control signal causes the semiconductor switch 49 to adjust ON/OFF ratio per one cycle to control consumed power.

Figure 4:
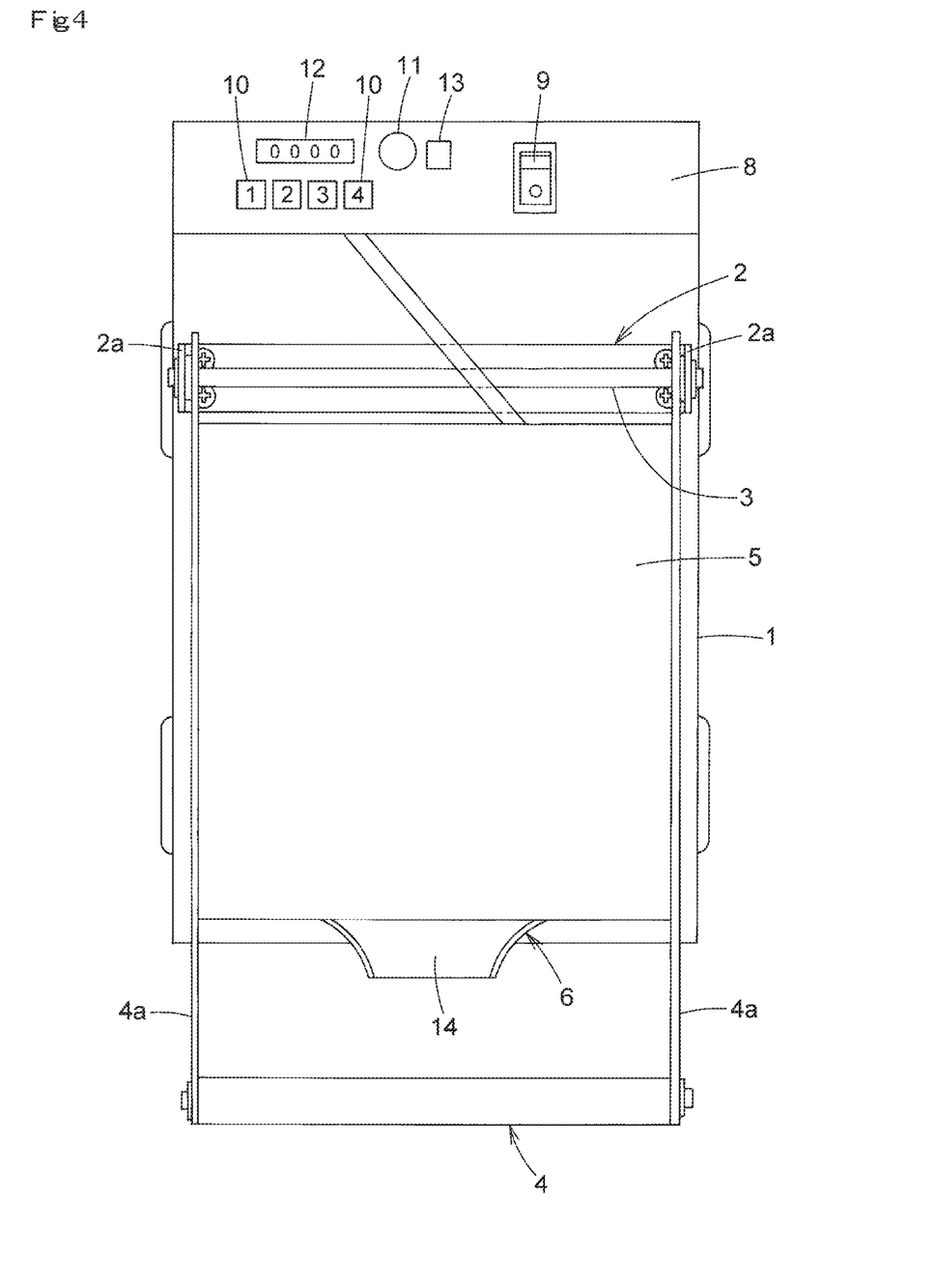
FIG. 4 is a top plan view thereof.
Figure 5:
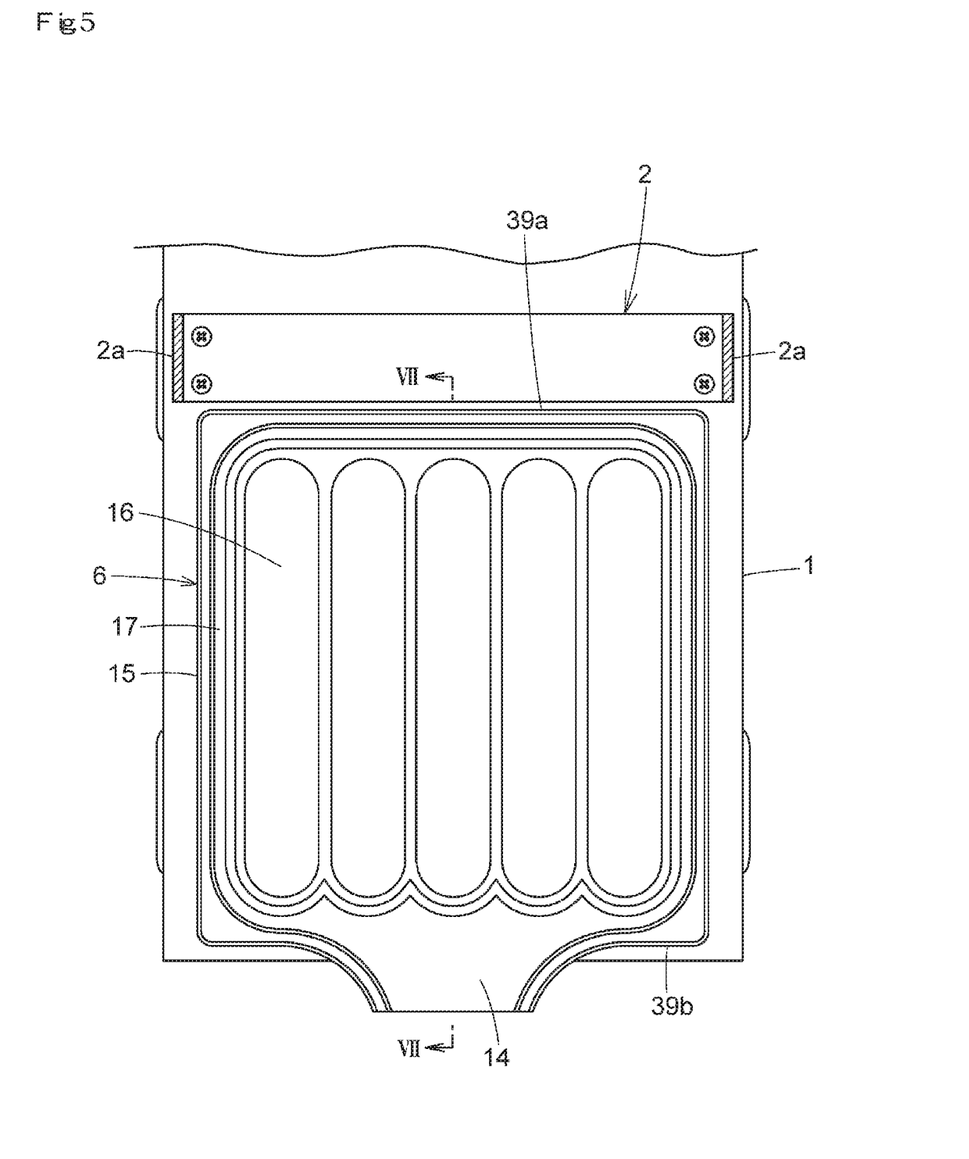
FIG. 5 is a top plan view of a lower housing on which a lower die is attached.

To the upper-heater power control device 50 are connected preset switches 51 actuated with the 1-4 present buttons 10 in FIG. 4 thereby enabling power transmission rate of the upper electric heater 45 to be determined. The Nos. 1-4 preset switches 51 gradually reduces power transmission rate to the upper electric heater 45 per one cycle, such as to 100%, 90%, 80%, 70%. Any one of the preset switches 51 is selectively turned ON. Accordingly, a predetermined ON/OFF control signal with different time ratio ON/OFF is supplied from the upper-heater power control device 50 to the semiconductor switch 49, so that the upper electric heater 45 is heated with selected power transmission rate or consumed power. Power transmission rate with the preset switch 51 can optionally be changed by a power transmission rate adjuster (not shown) in the upper-heater power control device 50. Power transmission rate or time ratio of ON/OFF is formerly determined corresponding to reduction rate in mass of the upper die 7 described later.

Figure 9:
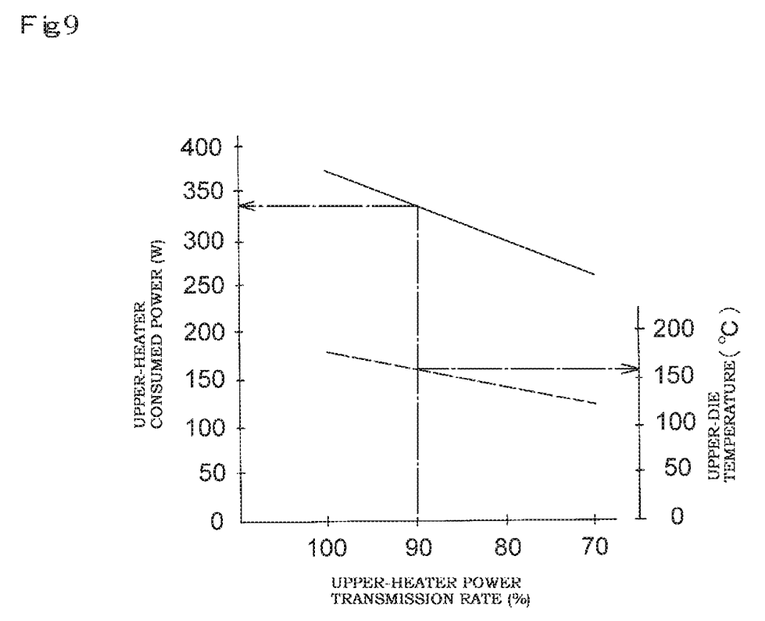
FIG. 9 is a graph showing how consumed power varies with upper-die reduction rate.

FIG. 9 shows how consumed power of the upper electric heater 45 vary with power transmission rate of the upper electric heater 45, and how temperature of the upper die 7 vary with power transmission rate of the upper electric heater 45. With reduction of power transmission rate, consumed power of the upper electric heater 45 and temperature of the upper die 7 are proportionally reduced.

When the preset switch 51 of power transmission rate 100% (No. 1) is selected, consumed power of the upper electric heater 45 becomes the rated power 375 W and heating temperature becomes about 180° C. When the preset switch 51 of power transmission rate 90% (No. 2) is selected, consumed power is controlled to about 310 W and temperature of the upper die 7 is reduced to about 162° C. When the present switch 51 of power transmission rate 80% (No. 3) is selected, consumed power is controlled to about 300 W and temperature of the upper die 7 is reduced to about 144° C. When the preset switch 51 of power transmission rate 70% (No. 4) is selected, consumed power is controlled to about 262 W and temperature of the upper die 7 is reduced to about 126° C. Taking account of baking time and doneness of the dough 19, when the electric heater 45 of the rated power 375 W is used in the embodiment, there is few with power-transmission rate of less than 70%.

Figure 10:
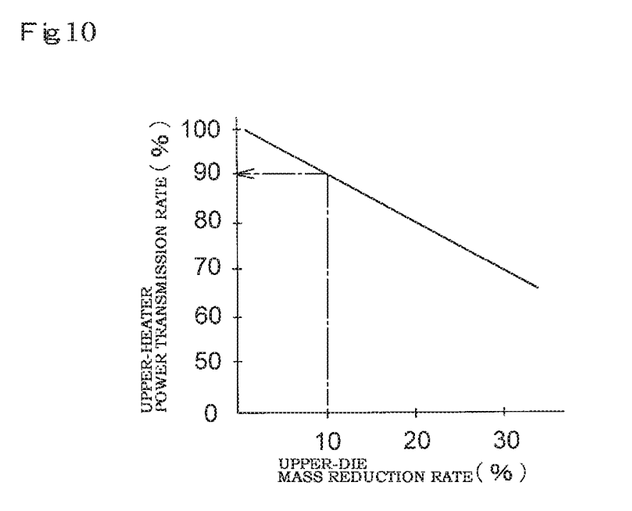
FIG. 10 is a graph showing how heater power transmission rate varies with upper-die mass reduction rate.

FIG. 10 shows one example of how the mass reduction rate of the upper die 7 to the lower die 6 vary with the power transmission rate of the upper electric heater 45. The power transmission rate of the upper electric heater 45 is proportionally reduced to the mass reduction rate of the upper die 7. This is because the mass of the substance is proportional to heat capacity. The smaller the mass is, the smaller the heat capacity is. It is likely heated to increase temperature.

Figure 11:
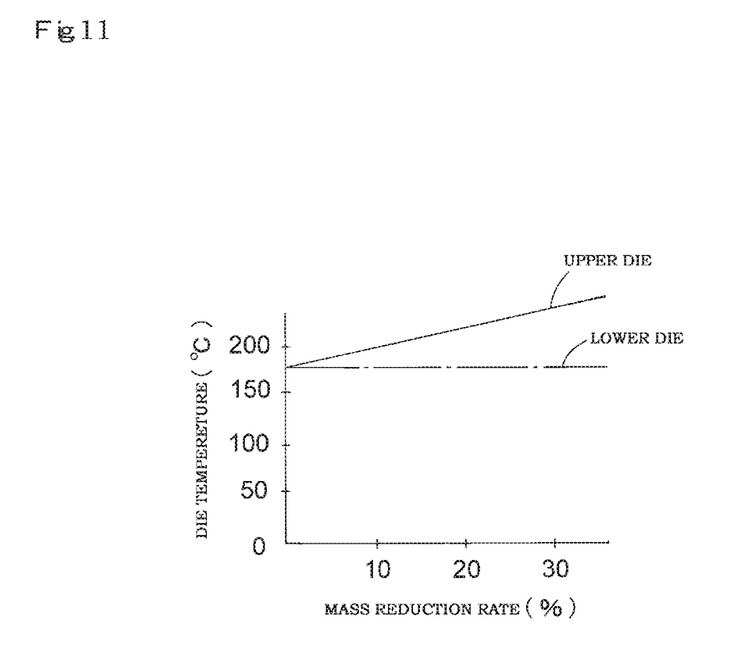
FIG. 11 is a graph showing how die temperature varies with mass-reduction rate.

FIG. 11 shows one example of how the die temperature vary with mass-reduction rate. The temperature of the lower die 6 heated at the maximum consumed power 375 W is stable at about 180° C., while the temperature of the upper die 7 proportionally increases with increase in the mass reduction rate. Thus, in order to allow the temperature of the upper die 7 to get closer to the temperature of the lower die 6, power transmission rate or consumed power of the upper electric heater 45 may be controlled to be low corresponding to the reduction rate of the mass of the upper die 7.

In this embodiment, for example, as the mass of the lower die 6 is 1 kg, and the mass of the upper die 7 is 900 g, the mass reduction rate of the upper die 7 is 10%. By selecting the preset switch 51 (No. 2) corresponding to the reduction rate, the power transmission rate of the upper electric heater 45 is controlled such that the maximum rated consumed power 100% (375 W) reduces to 90% (310 W). As shown by an alternate long and short dashes line in FIG. 13, excessive temperature rise is prevented, and the temperature of the upper die 7 can be come closer to the temperature, such as 180° C., of the lower die 6 detected by the temperature sensor 25. Thus, the dough 19 is uniformly heated and baked in the recesses 16, 18 of the lower die 16 and the upper die 18. Baked snack cakes unlikely burn on the surfaces. If the upper die 7 is greater than the lower die 6 in mass reduction rate by 20 or 30%, the preset switch 51 (Nos. 2 and 3) corresponding to the reduction rate can be selected. The temperature of the upper die 7 is reduced to be closer to the temperature of the lower die 6, so that the dough 19 can uniformly be baked.

Figure 12:
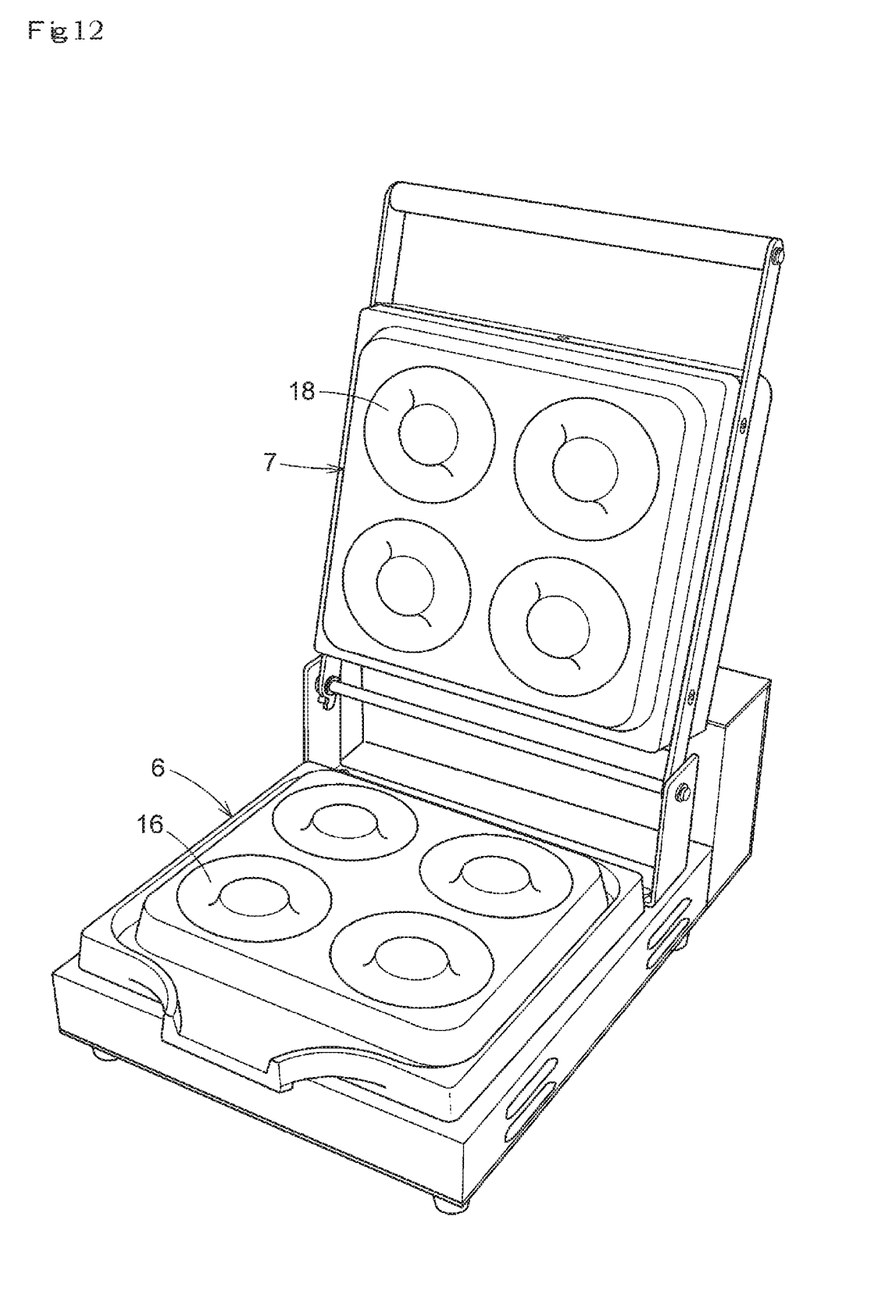
FIG. 12 is a front perspective view of the cooker in which another upper and lower dies are substituted.

In order to bake different shaped snack cakes in FIG. 12, the lower die 6 and the upper die 7 are replaced with those with different-shaped recesses 16, 18. If the preset switch 51 is selected to match a mass reduction rate of the upper die 7 with respect to the lower die 6, the upper die 7 is prevented from rising in temperature and the dough 19 can be baked at the temperature of the upper die 7 coming closer to the temperature of the lower die 6.

Figure 8:
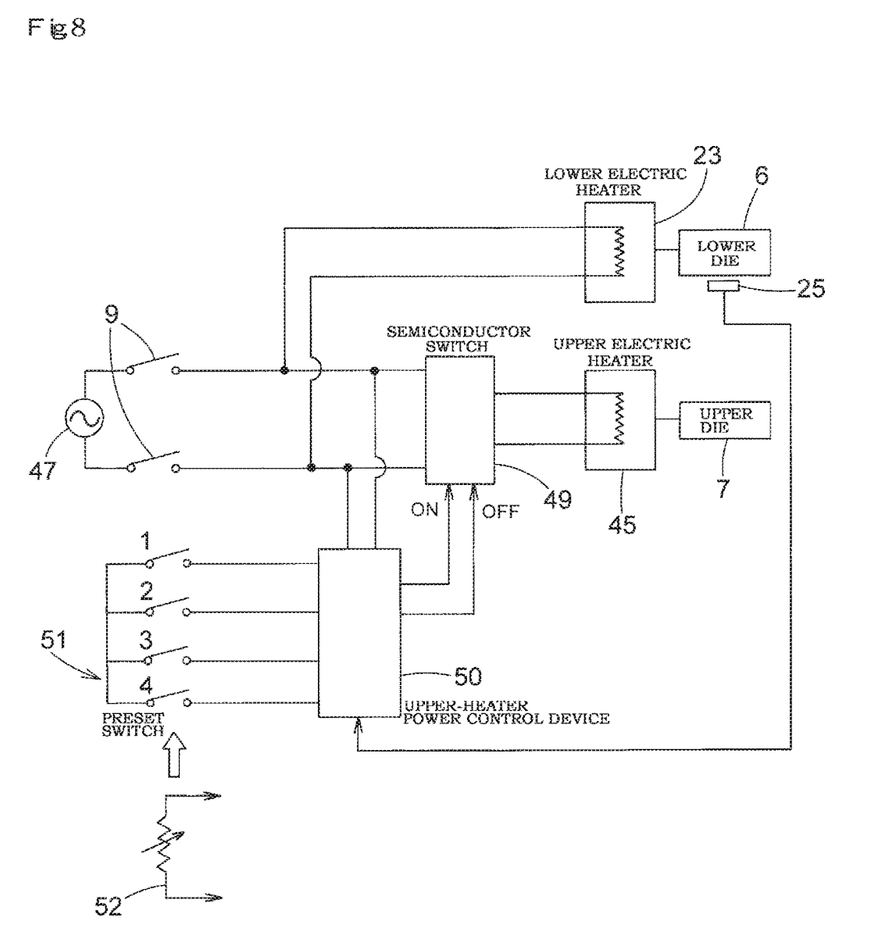
FIG. 8 is a circuit diagram of upper and lower heaters.

In FIG. 8, instead of the preset switch 51, a variable adjuster 52 actuated with an adjusting knob (not shown) in the control box 8 may be connected to the upper heater power control device 50 so that power transmission rate to the upper heater 45 can be gradually reduced continuously. The variable adjuster 52 can control the power transmission rate or consumed power of the upper electric heater 45 minutely corresponding to mass reduction rate of the upper die 7 to the lower die 6. Thus, the lower die 6 and the upper die 7 are heated at the maximum consumed power, and the temperature of the upper die 7 is raised with the lower die 7. The power transmission rate to the upper electric heater 45 can be controlled at optimum, and the dough 19 can uniformly be baked by making the temperature of the upper die 7 closer to the temperature of the lower die 6.

As mentioned above, according to the electric cooker and the method of baking both sides in the embodiment, even if the upper die 7 is smaller in mass than the lower die 7 and even if the temperature of the upper die 7 is raised by the lower die 6, the power transmission rate or consumed power of the upper electric heater 45 is controlled by the upper-heater power control device 50 to get lower than the maximum rated consumed power, and by preventing rise in temperature of the upper die 7 so that the temperature of the upper die 7 is closer to that of the lower die 6, the surface of the dough 19 is unlikely to be excessively heated or burnt, and the dough 19 can uniformly be heated as a whole. In order to make the upper die closer in temperature to the lower die, it is not necessary to set the upper die 7 in the same mass as the lower die 7, to detect the temperatures of the upper and lower dies with a temperature sensor respectively to control consumed power of the upper and lower heaters with a temperature control device respectively or to manufacture a plurality of heaters having different rated powers to correspond to the masses of the upper and lower masses, thereby providing a inexpensive both-side baking method and an electric cooker.

The present invention is not limited to the foregoing embodiments.

The foregoing embodiments relate to the lower die 6 greater than the upper die 7 in mass. In contrast, the lower die 6 may be smaller in mass than the upper die 7. In this case, contrary to the embodiments, the temperature of the upper die 7 is detected by the temperature sensor 25, and based on the detected temperature information, power transmission rate or consumed power of the lower electric heater 23 may be controlled by another heater power control device for the lower electric heater 23.

In the foregoing embodiments, the ON/OFF time division control system is used for the upper heater power control device 50, but a semiconductor phase control system and a cycle-control system heater power control device can be used.

Furthermore, in the foregoing embodiments, the preset switch 51 is turned on by the preset button 10, but a dial-type or sliding-type switch may be used.

A both-side baking method and an electric cooker for ingredients are not limited to bake the dough 19 for snack cakes, but may be applied to any ingredients to be heated if both sides are baked.

What is claimed is:

1. A method of baking both sides of ingredients, the method comprising:
    putting an upper die over a lower die, wherein the upper and lower dies have different respective masses such that one of the upper and lower dies has a greater mass and the other of the upper and lower dies has a smaller mass;
    heating the lower die and the upper die with electric heaters having the same rated power;
    detecting a temperature of the die having the greater mass to control consumed power of the electric heater that heats the die having the smaller mass, of which temperature is not detected; and
    making a temperature of the lower die and that of the upper die closer to each other to bake the ingredients,
    wherein the die having the greater mass is heated by its respective electric heater at a maximum rated consumed power of the electric heater, consumed power of the electric heater that heats the die having the smaller mass is controlled to become smaller than the maximum rated consumed power based on temperature information detected about the die having the greater mass, thereby preventing the die having the smaller mass from rising in temperature and making the temperature of the lower die and that of the upper die closer to each other.

2. The method of claim 1 wherein the mass of the lower die is greater than that of the upper die.

3. The method of claim 2 wherein consumed power of the electric heater that heats the upper die is preset to get smaller stepwise from the rated power such that one consumed power value corresponding to the mass of the upper die is selected from a plurality of stepwise consumed power values corresponding to each reduction rate of the mass of the upper die to make the temperature of the upper die closer to that of the lower die.

4. The method of claim 1 wherein the consumed power of the electric heater that heats the die having the smaller mass is controlled according to a previously determined relation between consumed power and temperature of the electric heater of the die having the smaller mass.

5. An electric cooker comprising:
    a lower housing;
    a lower die on an upper surface of the lower housing;
    an upper housing mounted to pivot upward with respect to the lower housing;

an upper die on a lower surface of the upper housing, a lower surface of the upper die covering an upper surface of the lower die, wherein the upper and lower dies have different masses such that one of the upper and lower dies has a greater mass and the other of the upper and lower dies has a smaller mass;

a temperature sensor that detects a temperature of the die having the greater mass;

a lower electric heater disposed in the lower housing to heat the lower die;

an upper electric heater disposed in the upper housing to heat the upper die and having a rated power the same as that of the lower electric heater; and a heater power control device connected at one side to the temperature sensor and at the other side to the die having the smaller mass, of which temperature is not detected, thereby controlling consumed power of the electric heater heating the die having the smaller mass, of which temperature is not detected and making a temperature of the lower die and that of the upper die closer to each other, wherein the die having the greater mass is heated by its respective electric heater at a maximum rated consumed power of the electric heater, consumed power of the electric heater that heats the die having the smaller mass is controlled by the heater power control device to become smaller than the maximum rated consumed power based on temperature information detected about the die having the greater mass, thereby preventing the die having the smaller mass from rising in temperature and making the temperature of the lower die and that of the upper die closer to each other.

6. The electric cooker of claim 5 wherein the mass of the lower die is greater than that of the upper die.

7. The electric cooker of claim 6 further comprising a plurality of preset switches connected to the heater power control device and each having a different consumed power, one of the preset switches being selected to reduce the temperature of the upper die and making the temperature of the upper die closer to that of the lower die to bake the ingredients uniformly.

8. The electric cooker of claim 6, further comprising a semiconductor switch connected to the heater power control device at one side and the upper die at the other side, an ON signal for turning on AC voltage and an OFF signal for turning off AC voltage being sent from the heater power control device to the semiconductor switch that controls the consumed power of the electric heater of the upper die by adjusting a ratio of the ON signal to the OFF signal.

9. The electric cooker of claim 6 wherein the temperature sensor is in contact with the lower die.

10. The electric cooker of claim 5 wherein the consumed power of the electric heater that heats the die having the smaller mass is controlled by the heater power control device according to a previously determined relation between consumed power and temperature of the electric heater of the die having the smaller mass, thereby making the temperature of the lower die and that of the upper die closer to each other.

* * * * *